United States Patent
Braghin et al.

(10) Patent No.: US 11,544,290 B2
(45) Date of Patent: Jan. 3, 2023

(54) INTELLIGENT DATA DISTRIBUTION AND REPLICATION USING OBSERVED DATA ACCESS PATTERNS

(71) Applicant: INTERNATIONAL BUSINESS MACHINES CORPORATION, Armonk, NY (US)

(72) Inventors: Stefano Braghin, Dublin (IE); Srikumar Venugopal, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 244 days.

(21) Appl. No.: 16/741,479

(22) Filed: Jan. 13, 2020

(65) Prior Publication Data

US 2021/0216572 A1    Jul. 15, 2021

(51) Int. Cl.
*G06F 16/20*     (2019.01)
*G06F 16/27*     (2019.01)
*G06F 16/215*    (2019.01)
*G06F 16/28*     (2019.01)
*G06N 5/04*      (2006.01)

(52) U.S. Cl.
CPC .......... *G06F 16/278* (2019.01); *G06F 16/215* (2019.01); *G06F 16/285* (2019.01); *G06N 5/04* (2013.01)

(58) Field of Classification Search
CPC .... G06F 16/278; G06F 16/285; G06F 16/215; G06N 5/04
See application file for complete search history.

(56) References Cited

U.S. PATENT DOCUMENTS

| | | | |
|---|---|---|---|
| 8,676,753 | B2 | 3/2014 | Sivasubramanian et al. |
| 9,053,167 | B1 | 6/2015 | Swift et al. |
| 10,268,726 | B1 | 4/2019 | Schiesser |
| 10,838,981 | B2* | 11/2020 | Keller ................... G06F 16/278 |
| 11,120,084 | B2* | 9/2021 | Orumchian ........ G06Q 10/0631 |
| 2005/0071331 | A1* | 3/2005 | Gao .................. G06F 16/24547 |
| 2007/0124274 | A1* | 5/2007 | Barsness ................. G06F 16/22 |
| 2016/0350375 | A1* | 12/2016 | Das ...................... G06F 16/2456 |
| 2016/0371328 | A1* | 12/2016 | Li ........................ G06F 16/2282 |
| 2017/0039232 | A1* | 2/2017 | Jayanth ................. G06F 16/278 |
| 2017/0228449 | A1* | 8/2017 | Cui ........................ G06F 16/221 |
| 2018/0026867 | A1 | 1/2018 | Macdonald et al. |
| 2019/0065573 | A1* | 2/2019 | Keller ................. G06F 16/2453 |
| 2019/0121709 | A1* | 4/2019 | Abouelwafa ........... G06F 3/065 |
| 2019/0147086 | A1* | 5/2019 | Pal ...................... G06F 16/2471 |
| | | | 707/718 |

(Continued)

OTHER PUBLICATIONS

"Method and System Assigning Clustered Data to Database Partitions Without Data Redistribution"; IPCOM000186372D; Original Publication Date: Aug. 17, 2009; (5 Pages).

(Continued)

*Primary Examiner* — Tarek Chbouki
(74) *Attorney, Agent, or Firm* — Griffiths & Seaton PLLC

(57) ABSTRACT

Embodiments for providing intelligent data replication and distribution in a computing environment. Data access patterns of one or more queries issued to a plurality of data partitions may be forecasted. Data may be dynamically distributed and replicated to one or more existing data partitions or additional of the plurality of data partitions according to the forecasting.

20 Claims, 6 Drawing Sheets

(56) References Cited

U.S. PATENT DOCUMENTS

| | | | | |
|---|---|---|---|---|
| 2019/0340274 A1* | 11/2019 | Keller | ............... | G06F 16/278 |
| 2020/0005015 A1* | 1/2020 | Liang | ............... | G06K 9/00201 |
| 2020/0153900 A1* | 5/2020 | Lebresne | ............... | G06F 3/067 |
| 2020/0233848 A1* | 7/2020 | Mathur | ............... | G06F 16/2282 |
| 2020/0233861 A1* | 7/2020 | Mathur | ............... | G06F 16/278 |
| 2021/0027241 A1* | 1/2021 | Burke | ............... | G06Q 10/0835 |
| 2021/0097077 A1* | 4/2021 | Rogers | ............... | G06N 20/20 |
| 2021/0200770 A1* | 7/2021 | Pandey | ............... | G06F 16/24552 |

OTHER PUBLICATIONS

"Reliable, Scalable and High-Performance Distributed Storage: Distributed Object Storage"; Weil et al.; IPCOM000234957D; Original Publication Date: Feb. 19, 2014, (11 Pages).

"Efficient Application Partitioning Within a Cluster Implementing High Availability"; IPCOM000237834D; Publication Date: Jul. 16, 2014; (4 Pages).

"Skew-Aware Automatic Database Partitioning in Shared-Nothing, Parallel OLTP Systems"; Pavlo, A. et al.; (12 Pages).

"Efficient Partitioning and Allocation of Data for Workflow Compositions"; Kish, AV.; (128 Pages).

* cited by examiner

INTELLIGENT DATA DISTRIBUTION AND REPLICATION USING OBSERVED DATA ACCESS PATTERNS

BACKGROUND OF THE INVENTION

Field of the Invention

The present invention relates in general to computing systems, and more particularly to, various embodiments for providing intelligent data distribution and replication using observed data access patterns by a processor.

Description of the Related Art

Computing systems may be found in the workplace, at home, or at school. The advent of computers and networking technologies have made possible the increase in the quality of life while enhancing day-to-day activities. Computer systems may include data storage systems, or disk storage systems, to process and store data. In recent years, both software and hardware technologies have experienced amazing advancement. With the new technology, more and more functions are added, and greater convenience is provided for use with these computing systems. The amount of information to be processed nowadays increases greatly. Therefore, processing, accessing, and storing very large amounts of information is a key problem to solve.

SUMMARY OF THE INVENTION

Various embodiments for providing intelligent data replication and distribution by a processor, are provided. In one embodiment, by way of example only, a method for providing intelligent data replication and distribution based on observed data access patterns, again by a processor, is provided. Data access patterns of one or more queries issued to a plurality of data partitions may be forecasted. Data may be dynamically distributed and replicated to one or more existing data partitions or additional of the plurality of data partitions according to the forecasting (e.g., based on the forecasted data access patterns).

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
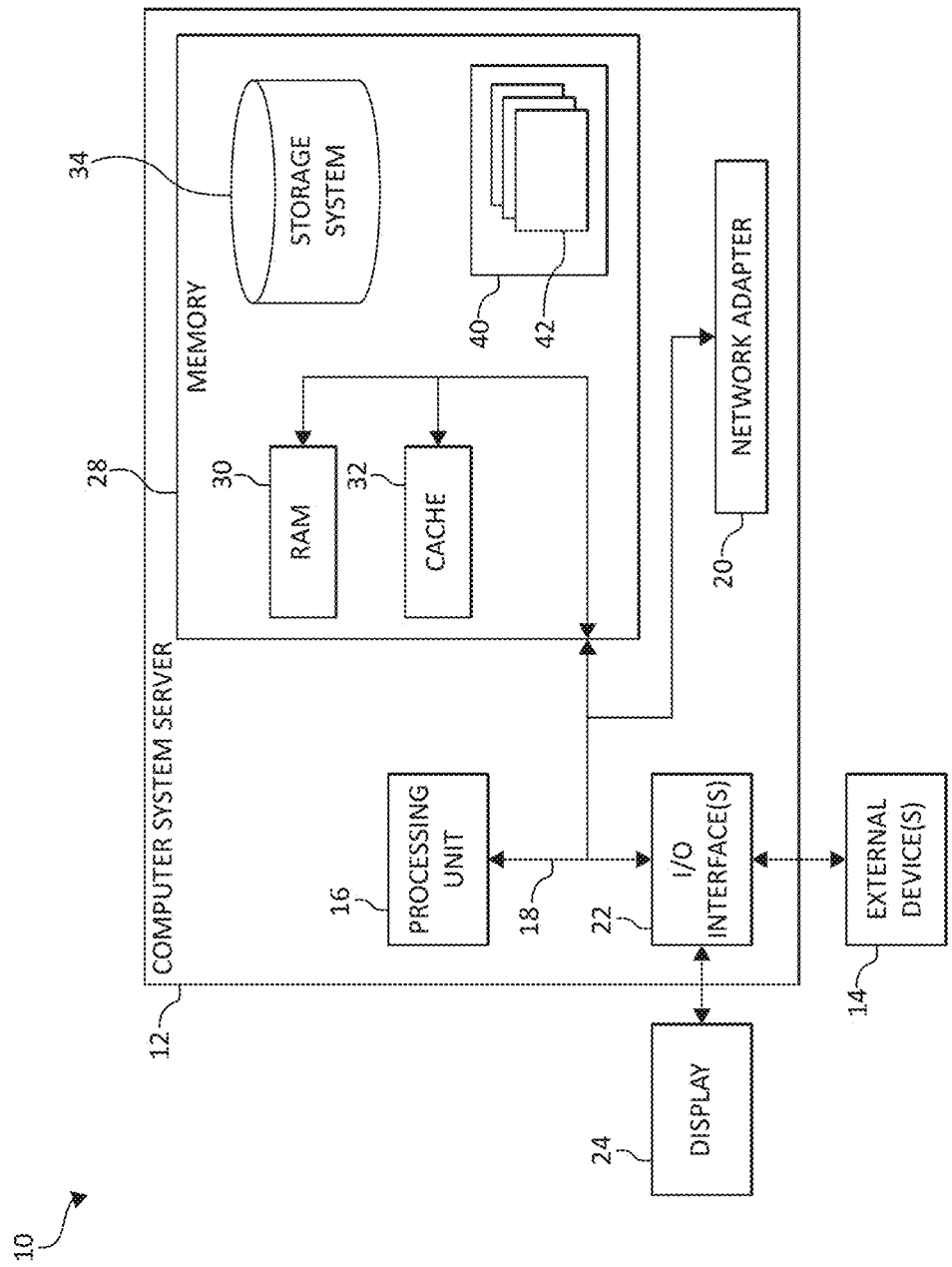
FIG. 1 is a block diagram depicting an exemplary cloud computing node according to an embodiment of the present invention.

As a preliminary matter, Big Data is a collection of tools, techniques, and operations used for data sets that becomes so voluminous and complex that traditional data processing applications are inadequate to store, query, analyze or process the data sets using current database management and data warehousing tools or traditional data processing applications. The challenges of handling big data include capturing data, storing data, analyzing data, searching data, sharing data, and visualization of the data.

For Big Data to function properly, Big Data may rely on several components, including a distributed file system, a job processing technology, or structured query using declarative languages. In order to achieve the required performance and scalability across large data sizes, it becomes essential to store the data in a structure that can deliver the required levels of performance and scalability. The storage structure may be a distributed cluster computing system (e.g., distributed storage system) so as to take advantage of the combined capacity of several computers (e.g., a few tens to several thousand of computers), and to be able to use ordinary, low-cost computers instead of costly dedicated high-capacity servers.

In one aspect, a distributed file system such as, for example, Hadoop file system ("HDFS") may be used for a Big Data system such as, for example, Apache™ Hive™ Apache™ Impala™, Apache™ Spark™, and Apache™ Hadoop®), creating a dependency on all Big Data systems over the HDFS. HDFS does suffer from performance efficiency, which is reflected in the performance of all the tools placed on top of the HDFS.

Additionally, data management systems, organized around keys and values, may include multiple interlinked datasets that may be stored across multiple physical and/or virtual computing system. Also, data replication and partitioning are crucial aspects for both security, reliability and performance of these data management systems. Data partitioning in a distributed computing system is a challenge mainly because it is hard to identify which is the optimal data partition, especially if there is uncertainty about the type of query/analytics that will be executed on the dataset. Also, data and its utilization may evolve over time making the originally optimal partitioning and replication strategy obsolete and potentially harmful from the system performance point of view. That is, data partitioning and data replication strategies are defined a priori, static, and do not evolve as data or the data usage changes.

Thus, assistance is required to leverage the burden for data(base) administrators for the identification of an updated (potentially) optimal data partitioning and replication strategy. For example, a database administrator is required to have a deep understanding of data organization and tuning the data for the specific requirements of current analytics workloads. This could lead to downtime while the data partitioning is being reorganized. This database administrator required assistance should also be transparent from system users' point of view, in order to remove the traditionally long and dangerous downtimes caused by state of the art repartitioning techniques.

Accordingly, a need exists to automatically reorganize the data (without data administration assistance) by overlaying a different data partition scheme that can improve performance of current analytics. The new partition scheme may be transparently applied by dynamically replicating dataset shards in order to meet performance requirements and guard against data loss.

Accordingly, various embodiments are provided herein to provide intelligent data replication and distribution based on observed data access patterns. Data access patterns of one or more queries issued to a plurality of data partitions may be forecasted. Data may be dynamically distributed and replicated to one or more existing data partitions or additional of the plurality of data partitions according to the forecasting (e.g., based on the forecasted data access patterns).

In one aspect, the present invention provides a data management system that repartitions data and reassigns data records to different partitions. This repartitioning operation may be automatic and transparent. In one aspect, the management system may discover clusters of data partitions that are being queried in conjunction. The data management system may predict a pattern and/or trend of the query workload on these partitions. The data management system may generate and/or create new copies of popular data partition clusters that have been where: a) the query type is taken into consideration while identifying specific partitions to move, and b) data partitions may be replicated together (in conjunction as a cluster) from different nodes to a new node to reduce overall network traffic and/or or across nodes in order to create new copies of co-located clusters. The data management system may remove excess partitions in order to facilitate future replications of different partition groups.

In general, "optimize" (or "enhance" which may be interchangeably with "optimize") may refer to and/or be defined as "maximize," "minimize," or attain one or more specific targets, objectives, goals, or intentions. Optimize may also refer to maximizing a benefit to a user (e.g., maximize a transaction benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of data partition and replication based on observed data patterns, but there may be a variety of factors that may result in alternate suggestion of a combination of data partition and replication based on observed data patterns yielding better results. For example, an optimization problem may search for a combination of factors that result in a minimum and/or maximum combination of data partition and replication based on observed data patterns to minimize costs, computing inefficiencies, excess data use and storage, and network disruption.

Thus, some changes to the variety of factors/parameters may result in a jump from one minimum/maximum to another minimum/maximum. In either case, resulting suggestions of a combination of shopping/travel routes, location/store and/or vehicle characteristics, machine learning models (e.g., data partition and replication based on observed data patterns models, etc.), and/or user-defined constraints may be considered "good enough," "substantially optimal," and/or "sufficiently good." Herein, the term "optimize" (or "enhanced") may refer to such results based on minima (or maxima, depending on what parameters are considered in the optimization problem) for suggesting of a combination of data partition and replication based on observed data patterns, machine learning models, and/or user-defined constraints.

In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It should be noted as described herein, the term "intelligent" (or "intelligence") may be relating to, being, or involving conscious intellectual activity such as, for example, thinking, reasoning, or remembering, that may be performed using a machine learning. In an additional aspect, intelligent or "intelligence" may be the mental process of knowing, including aspects such as awareness, perception, reasoning and judgment. A machine learning system may use artificial reasoning to interpret data relating to one or more data partitions, replications, queries and query types that may be determined and/or derived by machine learning.

In an additional aspect, intelligent or "intelligence" may refer to a mental action or process of acquiring knowledge and understanding through thought, experience, and one or more senses using machine learning. Intelligent or "intelligence" may also refer to identifying patterns of behavior (e.g., identify data partitions being accessed according to a query/query type), leading to a "learning" of one or more events, operations, or processes. Thus, the intelligent or "intelligence" model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to an intelligent or "intelligence" system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. An intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question/query answering, identification of related concepts within different portions of content in a corpus, and intelligent search algorithms.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
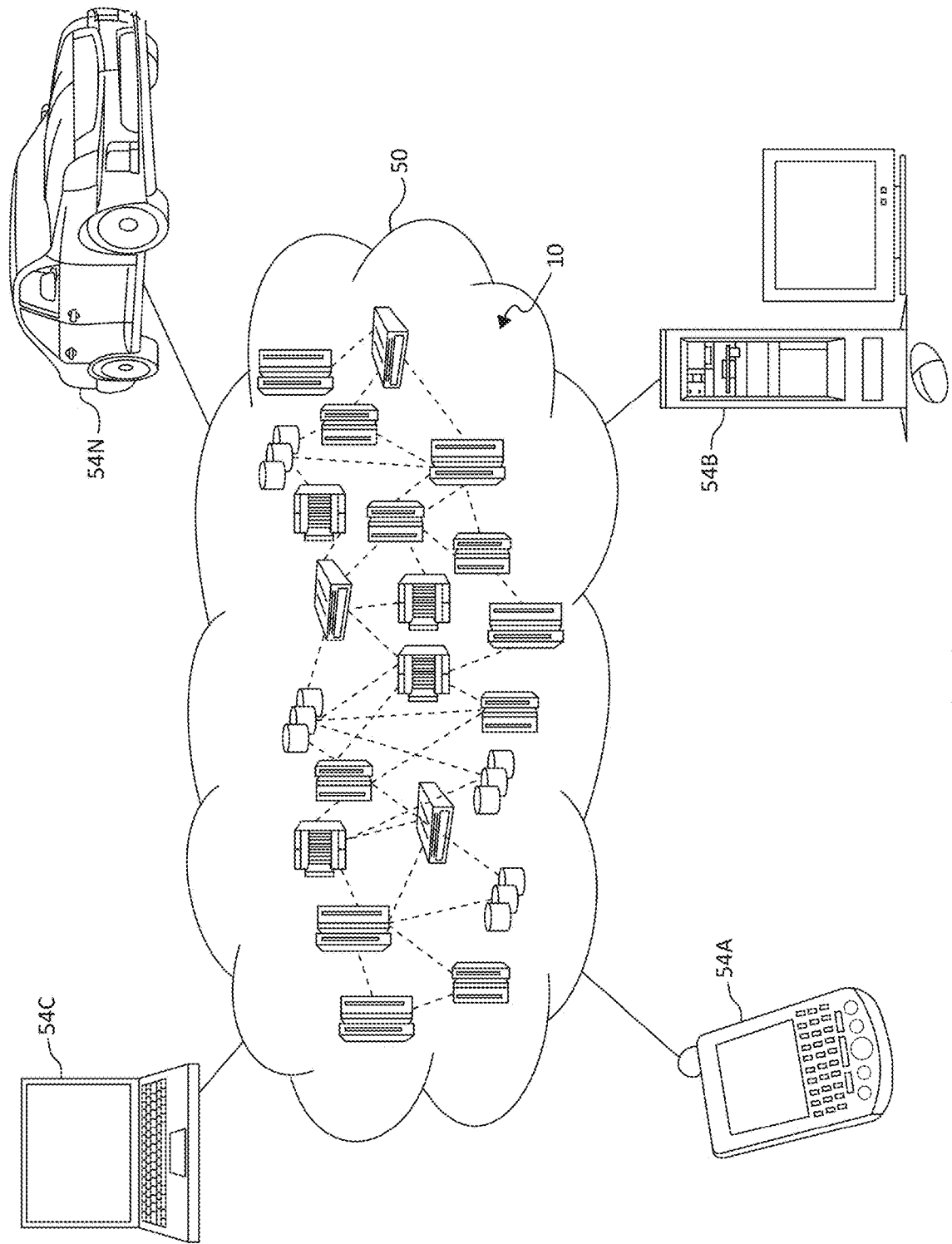
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
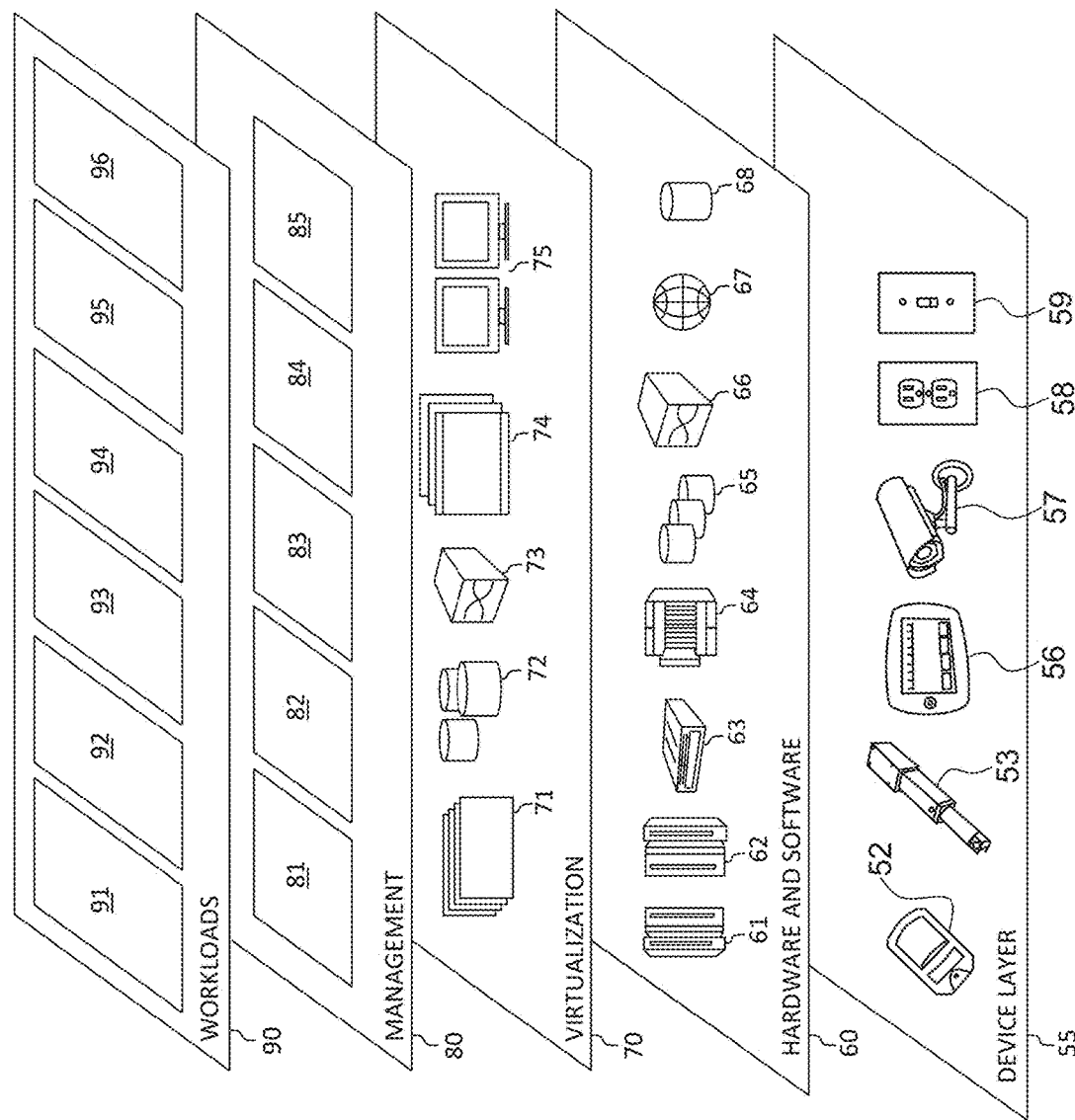
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing intelligent data distribution and replication using observed data access patterns. In addition, workloads and functions 96 for providing intelligent data distribution and replication using observed data access patterns may include such operations as data analytics, data analysis, and as will be further described, notification functionality. One of ordinary skill in the art will appreciate that the workloads and functions 96 for providing intelligent data distribution and replication using observed data access patterns may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
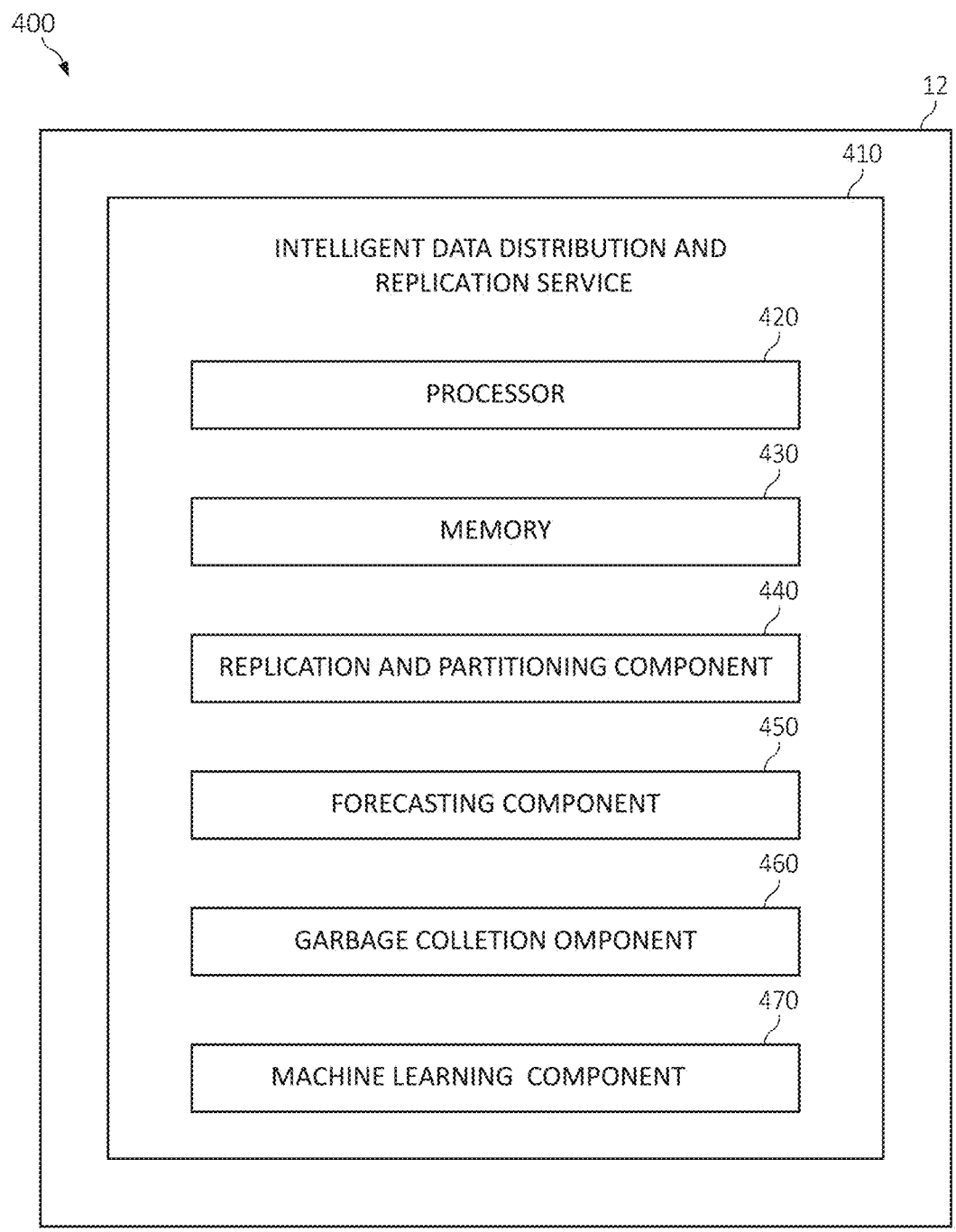
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. Repetitive description of like elements employed in other embodiments described herein (e.g., FIGS. 1-3) is omitted for sake of brevity.

An intelligent data distribution and replication service 410 is shown, incorporating processing unit ("processor") 420 to perform various computational, data processing and other functionality in accordance with various aspects of the present invention. The intelligent data distribution and replication service 410 may be provided by the computer system/server 12 of FIG. 1. The processing unit 420 may be in communication with memory 430. The intelligent data distribution and replication service 410 may include a replication and partitioning component 440, a forecasting component 450, a garbage collection component 460, and a machine learning component 470.

As one of ordinary skill in the art will appreciate, the depiction of the various functional units in intelligent data distribution and replication service 410 is for purposes of illustration, as the functional units may be located within the intelligent data distribution and replication service 410 or elsewhere within and/or between distributed computing components.

In one embodiment, by way of example only, the replication and partitioning component 440 may dynamically distribute and replicate data to one or more existing data partitions or additional of the plurality of data partitions according to the forecasting.

In one aspect, the data distribution and replication may be performed by the replication and partitioning component 440 based on administrative constraints, storage constraints, and performance/execution oriented constraints that are inferred from the observation of how data is effectively accessed during the life cycle of the data within a distributed data storage system. Also, the queries may be performed to retrieve rows stored in a database for the distributing of data partitions for the database. Also, the data partitions may be moved, but avoids a record-by-record transfer by copying a partition as a block. Thus, the replication and partitioning component 440 may perform incremental repartitioning based on query statistics and then replication to distribute data on-demand and improve access performance.

The forecasting component 450 may predict or "forecast" one or more data access patterns of one or more queries issued to a plurality of data partitions. The garbage collection component 460 may perform/execute a garbage collection operation to remove excess partitions to facilitate future replications of different partition groups.

The replication and partitioning component 440, and may use the machine learning component 470, may identify and learn one or more clusters of the plurality of data partitions being simultaneously queried with the one or more queries. The replication and partitioning component 440 may replicate one or more new copies of those of the plurality of data partitions having a greater frequency of access or use as compared to other data partitions of the plurality of data partitions. The replication and partitioning component 440 may replicate one or more new copies of those of the plurality of data partitions according to a query type of the one or more queries and identifying those of the plurality of data partitions ready for distribution.

In an additional aspect, the replication and partitioning component 440 may replicate one or more new copies of those of the plurality of data partitions from a plurality of different nodes together as a cluster on a single node. The replication and partitioning component 440 may replicate one or more new copies of those of the plurality of data partitions from a plurality of different nodes together as co-located cluster across a plurality of nodes.

By way of example only, the machine learning component 470 may identify, discover, observe, and/or learn clusters of the plurality of data partitions being simultaneously queried with the one or more queries, along with predicting (e.g., forecasting) an amount of workload required for each type of query. In so doing, the machine learning component 470 may train and build one or more machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
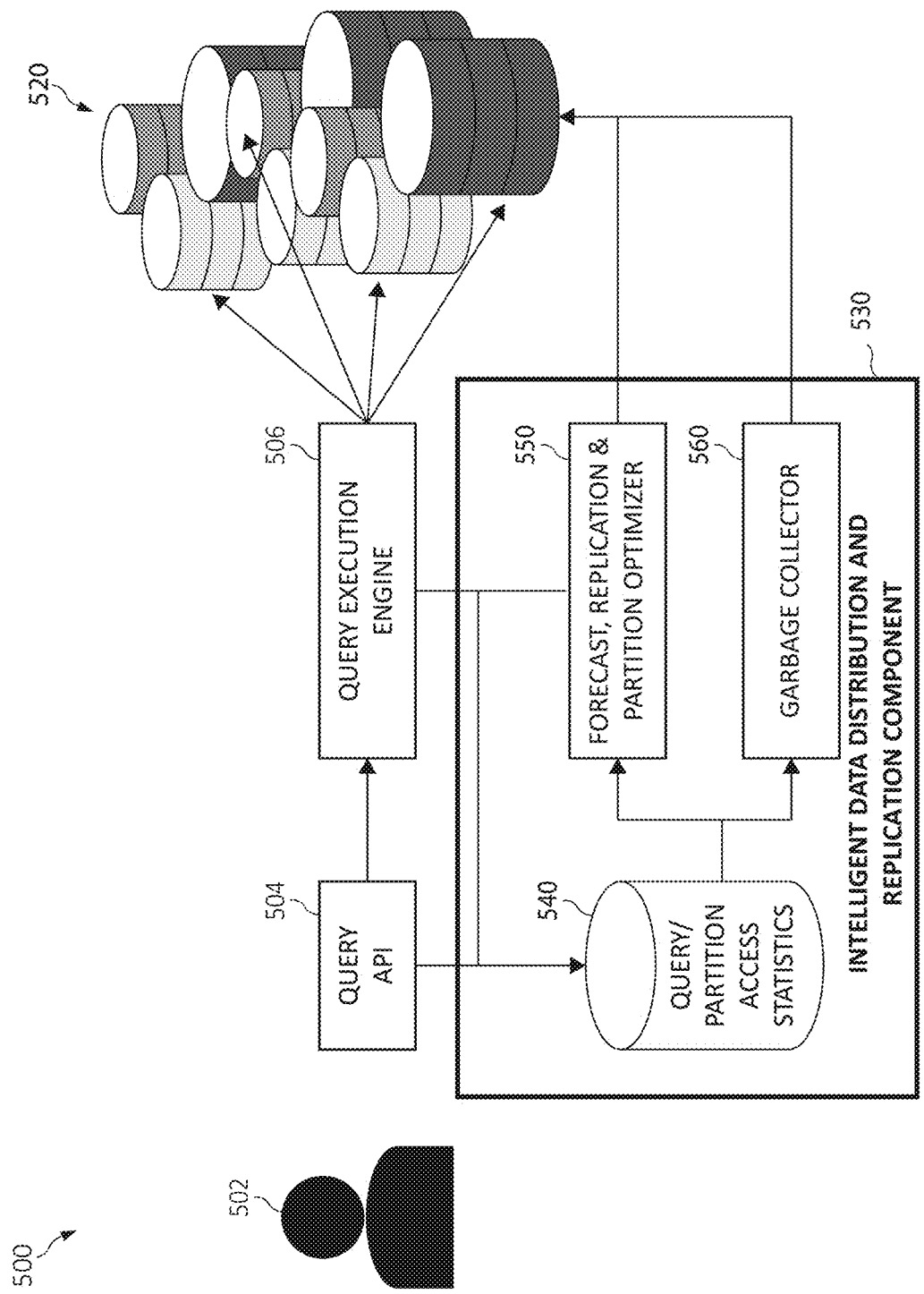
FIG. 5 is diagram depicting an additional exemplary operation for providing intelligent data distribution and replication using observed data access patterns by a processor, again in which aspects of the present invention may be realized.

Turning now to FIG. 5, a block diagram of exemplary functionality 500 relating to providing intelligent data distribution and replication using observed data access patterns that repartitions data and reassigns data records to different partitions according to various aspects of the present invention. As shown, the various blocks of functionality are depicted with arrows designating the blocks' 500 relationships with each other and to show process flow. Additionally, descriptive information is also seen relating each of the functional blocks 500.

As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system in accordance with the present invention. Many of the functional blocks 500 may execute as background processes on various components, either in distributed computing components, or on the user device, or elsewhere, and generally unaware to the user. Repetitive description of like elements, components, modules, services, applications, and/or functions employed in other embodiments described herein is omitted for sake of brevity.

In one aspect, by way of example only, a user 502 may issue a query via a query application programming interface ("API") 504. A query execution engine 506 may execute the query to a cluster of nodes/blocks 520. That is, the query execution engine 506 may access a particular data block from the cluster of nodes/blocks 520 according to the query and/or query type. In one aspect, the query execution engine 506 may be a component of a data management system that receives user requests (in form of queries). The query execution engine 506 may analyze the query to identify how it needs to be executed, and sends low level operations to one or more nodes of a cluster that will in turn retrieve data in response.

Also, the query API 504 may forward the query to the intelligent data distribution and replication component 510 to access a statistics database 540 to learn, identify, observe, or used one or more related statistics about access to data partition according to the query or type of query. That is, the object of the present invention is to limit the amount of data being distributed and replicated, so each time a query is issued, the statics assist with identify which of the data partitions are being accessed based on the query/query type. A machine learning operation may be used to determine where to distribute/move the data that is most optimal (e.g., a single node of the cluster of nodes/blocks 520 and/or across multiple nodes of cluster of nodes/blocks 520). Thus, the observed data pattern workloads (where a workload may be defined as the number of queries issued over a selected period of time such as, for example, the number of queries the query API receives over time) of each query/query type may be learned, observed, and/or identified using the query partition/access pattern statistics.

The identified statistics of the query/query type (e.g., the observed data pattern workloads of each query/query type) may be fed to the forecast, replication and partition optimizer 550. The forecast, replication and partition optimizer 550 may: a) discover one or more clusters of data partitions that are being queried in conjunction with each other; and/or b) predict a pattern and/or trend of the query workload(s) on each of the data partitions. The forecast, replication and partition optimizer 550 may create new copies of a "popular" partition clusters (e.g., "popular" being those of the plurality of data partitions having a greater frequency of access or use as compared to other data partitions of the plurality of data partitions) where: a) the query type (e.g., inner join, outer join (left/right/full)) is taken into consideration while identifying specific partitions to move/distribution (to one or more nodes of the cluster of nodes/blocks 520), and/or b) the data partitions are replicated together (in conjunction as a cluster) from different nodes to a new nodes to reduce overall network traffic, or across nodes in order to create new copies of co-located clusters. The garbage collection component 560 may be used to remove excess data partitions in order to facilitate future replications of different partition groups.

It should be noted that the queries may be classified according to the operations that the queries involve. In particular, the present invention may focus on those queries involving various type of join operations. For example, a join operation may involve two tables and outputs rows within those tables that are matching according to certain properties defined on both such as, for example, values of column A of a first table (e.g., "table 1") may qual to values of column B of a second table (e.g., "table 2"). A natural join, inner join, and/or outer join are characterization of the join operation with respect to missing and/or not matched values.

In view of FIGS. 1-5, the present invention may be applied to a high performance massively parallel processing (MPP) structured query language ("SQL") engine such as, for example, IBM® BIG SQL for an application that may facilitate the use of a network of computing systems to solve problems involving massive amounts of data and computation such as, for example, in a distributed file system ("DFS") and/or leverages a distributed execution engine (e.g., IBM® Apache Spark™) employing replication (e.g., Hadoop Distributed File System "HDFS").

In one aspect, the present invention may be employed in a data warehouse system such as, for example, Apache® HIVE that is built on top of Apache Hadoop that facilitates easy data summarization, ad-hoc queries, and the analysis of large datasets stored in various databases and file systems that integrate with Apache® Hadoop™.

In its simplest utilization, the data warehouse system allows the execution of SQL-like queries on data stored in the HDFS. The modification to the data warehouse system may include extending the statistics stored about the executed queries. In particular, one or more aspects of the present invention requires the storage of related statistics about access to data partition per query/query type. The identified statistics may then be fed to a partitioning/replication schema optimizer that, in turn will instruct a modified version of HDFS to perform lazy repartitioning according to specified instructions.

The required modification to HDFS may include exposing an API for triggering on-demand and user defined repartitioning (it should be noted that this process is currently this is managed by the name node with respect to customizable but predefined policies). A garbage collector component may trigger the same API in the HDFS to remove unnecessary replicas once one or more conditions have changed (e.g., evolution of data and/or queries executed within a selected/defined time frame).

In an additional aspect, the present invention may be employed the MPP SQL engine (e.g., IBM® Big SQL) and Apache HDFS. The MPP SQL engine may be an advanced query execution engine, which can co-exist with Apache® HIVE™ and leverage Apache® HIVE™ storage model and meta-store. Thus, in this embodiment, the present invention may include modifying the MPP SQL engine and/or APACHE® Hive™ by extending the statistics stored about the executed queries. In particular, the storage of related statistics about access to data partition per query/query type may be provided to the MPP SQL engine. The statistics are may then be fed to a partitioning/replication schema optimizer that, in turn will instruct a modified version of HDFS to perform lazy repartitioning according to specified instructions.

The required modification to HDFS may include exposing an API for triggering on-demand and user defined repartitioning (it should be noted that this process is currently this is managed by the name node with respect to customizable but predefined policies). A garbage collector component may trigger the same API in the HDFS to remove unnecessary replicas once one or more conditions have changed (e.g., evolution of data and/or queries executed within a selected/defined time frame).

Figure 6:
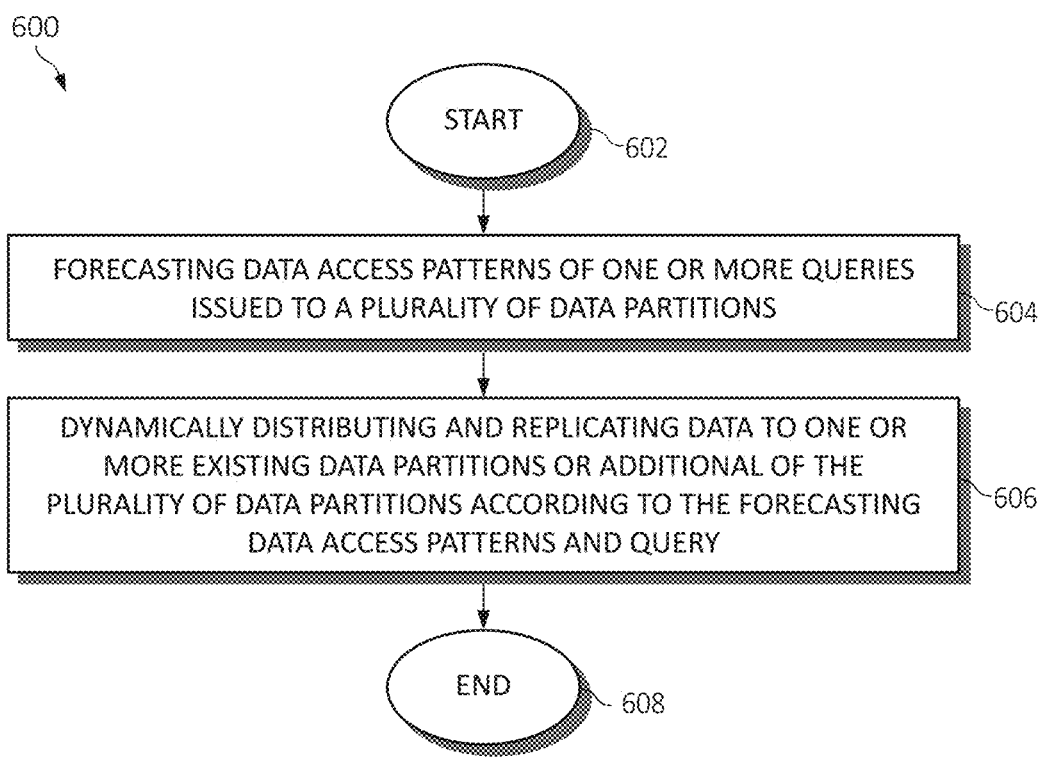
FIG. 6 is a flowchart diagram depicting an exemplary method for providing intelligent data distribution and replication using observed data access patterns in a computing environment, again in which various aspects of the present invention may be realized.

FIG. 6 is an additional flowchart diagram 600 depicting an exemplary method for providing intelligent data distribution and replication using observed data access patterns in a computing environment, again in which various aspects of the present invention may be realized. The functionality 600 may be implemented as a method executed as instructions on a machine, where the instructions are included on at least one computer readable medium or one non-transitory machine-readable storage medium. The functionality 600 may start in block 602.

Data access patterns of one or more queries issued to a plurality of data partitions may be forecasted, as in block 604. Data may be dynamically distributed and replicated to one or more existing data partitions or additional of the plurality of data partitions according to the forecasting data access patterns and query, as in block 606. The functionality 600 may end, as in block 606.

In one aspect, in conjunction with and/or as part of at least one block of FIG. 6, the operations of method 600 may include each of the following. The operations of method 600 may use a garbage collection operation to remove excess partitions to facilitate future replications of different partition groups. The operations of method 600 may identify one or more clusters of the plurality of data partitions being simultaneously queried with the one or more queries.

The operations of method 600 may replicate one or more new copies of those of the plurality of data partitions having a greater frequency of access or use as compared to other data partitions of the plurality of data partitions, and/or replicate one or more new copies of those of the plurality of data partitions according to a query type of the one or more queries and identifying those of the plurality of data partitions ready for distribution.

The operations of method 600 may replicate one or more new copies of those of the plurality of data partitions from a plurality of different nodes together as a cluster on a single node. The operations of method 600 may replicate one or more new copies of those of the plurality of data partitions from a plurality of different nodes together as co-located cluster across a plurality of nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing intelligent data replication and distribution by one or more processors, comprising:
   forecasting data access patterns of one or more queries issued to a plurality of data partitions using pattern data identified from historical queries specifically directed to join operations and issued to at least two of the plurality of data partitions in conjunction with one another, wherein the pattern data is used to correlate those of the at least two of the plurality of data partitions to a particular type of the join operations specified in a respective query of the one or more queries; and
   dynamically distributing and replicating data to one or more existing data partitions or additional of the plurality of data partitions according to the forecasting.

2. The method of claim 1, further including using a garbage collection operation to remove excess partitions to facilitate future replications of different partition groups.

3. The method of claim 1, further including identifying one or more clusters of the plurality of data partitions being simultaneously queried with the one or more queries.

4. The method of claim 1, further including replicating one or more new copies of those of the plurality of data partitions having a greater frequency of access or use as compared to other data partitions of the plurality of data partitions.

5. The method of claim 1, further including replicating one or more new copies of those of the plurality of data partitions according to a query type of the one or more queries and identifying those of the plurality of data partitions ready for distribution.

6. The method of claim 1, further including replicating one or more new copies of those of the plurality of data partitions from a plurality of different nodes together as a cluster on a single node.

7. The method of claim 1, further including replicating one or more new copies of those of the plurality of data partitions from a plurality of different nodes together as co-located cluster across a plurality of nodes.

8. A system for providing intelligent data replication and distribution in a computing environment, comprising:
one or more computers with executable instructions that when executed cause the system to:
forecast data access patterns of one or more queries issued to a plurality of data partitions using pattern data identified from historical queries specifically directed to join operations and issued to at least two of the plurality of data partitions in conjunction with one another, wherein the pattern data is used to correlate those of the at least two of the plurality of data partitions to a particular type of the join operations specified in a respective query of the one or more queries; and
dynamically distribute and replicate data to one or more existing data partitions or additional of the plurality of data partitions according to the forecasting.

9. The system of claim 8, wherein the executable instructions use a garbage collection operation to remove excess partitions to facilitate future replications of different partition groups.

10. The system of claim 8, wherein the executable instructions identify one or more clusters of the plurality of data partitions being simultaneously queried with the one or more queries.

11. The system of claim 8, wherein the executable instructions replicate one or more new copies of those of the plurality of data partitions having a greater frequency of access or use as compared to other data partitions of the plurality of data partitions.

12. The system of claim 8, wherein the executable instructions replicate one or more new copies of those of the plurality of data partitions according to a query type of the one or more queries and identifying those of the plurality of data partitions ready for distribution.

13. The system of claim 8, wherein the executable instructions replicate one or more new copies of those of the plurality of data partitions from a plurality of different nodes together as a cluster on a single node.

14. The system of claim 8, wherein the executable instructions replicate one or more new copies of those of the plurality of data partitions from a plurality of different nodes together as co-located cluster across a plurality of nodes.

15. A computer program product for providing intelligent data replication and distribution in a computing environment by a processor, the computer program product comprising a non-transitory computer-readable storage medium having computer-readable program code portions stored therein, the computer-readable program code portions comprising:
an executable portion that forecasts data access patterns of one or more queries issued to a plurality of data partitions using pattern data identified from historical queries specifically directed to join operations and issued to at least two of the plurality of data partitions in conjunction with one another, wherein the pattern data is used to correlate those of the at least two of the plurality of data partitions to a particular type of the join operations specified in a respective query of the one or more queries; and
an executable portion that dynamically distributes and replicates data to one or more existing data partitions or additional of the plurality of data partitions according to the forecasting.

16. The computer program product of claim 15, wherein the executable portion uses a garbage collection operation to remove excess partitions to facilitate future replications of different partition groups.

17. The computer program product of claim 15, wherein the executable portion identifies one or more clusters of the plurality of data partitions being simultaneously queried with the one or more queries.

18. The computer program product of claim 15, wherein the executable portion replicates one or more new copies of those of the plurality of data partitions having a greater frequency of access or use as compared to other data partitions of the plurality of data partitions.

19. The computer program product of claim 15, wherein the executable portion:
replicates one or more new copies of those of the plurality of data partitions according to a query type of the one or more queries and identifying those of the plurality of data partitions ready for distribution; or
replicates one or more new copies of those of the plurality of data partitions from a plurality of different nodes together as a cluster on a single node.

20. The computer program product of claim 15, wherein the executable portion replicates one or more new copies of those of the plurality of data partitions from a plurality of different nodes together as co-located cluster across a plurality of nodes.

* * * * *